Patented May 15, 1945

2,376,105

UNITED STATES PATENT OFFICE 2,376,105

ESTERS OF THIOCYANO-SUBSTITUTED ORGANIC ACIDS

Paul H. Williams, Berkeley, Calif., assignor to Shell Development Company, San Francisco, Calif., a corporation of Delaware No Drawing. Application March 6, 1944,
Serial No. 525,303

5 Claims. (Cl. 260—454)

This invention relates to esters of thiocyano-substituted organic acids, and more particularly pertains to esters of thiocyano-substituted organic acids which esters have the general formula

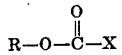

wherein R is a butyl-substituted cyclohexyl radical, and X is a thiocyano-substituted hydrocarbon radical. In one of its most specific embodiments, the invention relates to 4-tert-butylcyclohexyl thiocyanoacetate.

The esters of thiocyano-substituted organic acids of the invention have many important uses. They may, for example, be used as wetting agents, as plasticizers, as addition agents for rubber, and as intermediates in the synthesis of other valuable organic compounds. They are particularly useful as insecticides, fungicides, and parasiticides since, in addition to possessing unusually high insecticidal activity, they have an inoffensive odor, are light-stable, are compatible with or soluble in light paraffinic mineral oils such as kerosene, and are not damaging in any way to fabrics, wall paper, painted walls, etc. The use as insecticides, fungicides and parasiticides of compounds of the same general type as those presently disclosed is described and claimed in the co-pending application, Serial Number 482,032, filed April 6, 1943.

The thiocyano-substituted esters of the invention have the general formula

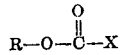

wherein R is a butyl-substituted cyclohexyl radical, and X is a thiocyano-substituted hydrocarbon radical. The butyl group which is substituted upon the cyclohexyl nucleus may be a normal-butyl (n-butyl) group, a secondary butyl (sec-butyl) group, an isobutyl group or a tertiary butyl (tert-butyl) group. It may be substituted upon any carbon atom of the cyclic structure, although the 2, 3 or 4 positions are preferred positions. Since thiocyano compounds which contain within their molecular structure a carbon atom which is directly attached to four other carbon atoms have been found to be particularly active as insecticidal toxicants, the tert-butyl-cyclohexyl esters, particularly the 4-tert-butyl-cyclohexyl esters such as 4-tert-butylcyclohexyl thiocyanoacetate,

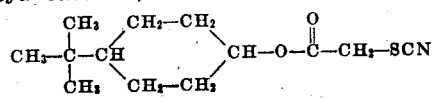

represent particularly desirable and useful members of the group of butylcyclohexyl thiocyano esters described herein.

Although the radical represented by X in the hereinabove defined general formula

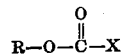

may be any thiocyano-substituted hydrocarbon radical, it is preferably a mono-, di-, or poly-thiocyano-substituted aliphatic radical derived from the saturated or unsaturated aliphatic acid of corresponding structure. The resulting preferred compounds are, therefore, the alkyl-substituted cyclohexyl esters of the mono-, di-, or poly-thiocyano-substituted saturated or unsaturated aliphatic acids. The aliphatic acid residue may be of any desired molecular weight, depending upon the use to which the ester is to be put. The alkylcyclohexyl esters of the lower thiocyano aliphatic acids having from 2 to 6 carbon atoms may, for example, be particularly effective for use as insecticidal toxicants while the cyclohexyl esters of the higher acids, i. e. those having up to about 20 carbon atoms, may be more suitable for use as wetting agents.

Representative acids, which may be used in forming the desired thiocyano esters include the $C_2$ to $C_{20}$ straight chain and branched chain saturated and unsaturated aliphatic acids such as acetic acid, propionic acid, butyric acid, valeric acid, caproic acid, capric acid, undecylic acid, undecylenic acid, lauric acid, myristic acid, palmitic acid, oleic acid, stearic acid, arachidic acid, and their homologues and analogues together with suitably substituted compounds thereof, such as hydroxyacetic acid, lactic acid, d-hydroxy-n-butyric acid, d-hydroxyisovaleric acid, ricinoleic acid, etc.

The compounds of the invention may be prepared in a variety of ways. They may be prepared, for example, by reacting inorganic thiocyanates with the sulfated esters of the appropriate alcohols. However, a preferred method of preparation generally comprises reacting a butyl-substituted cyclohexanol, e. g. 4-tert-butylcyclohexanol, with a suitable halogen-substituted acylating agent, and reacting the ester so produced with a suitable metal thiocyanate to obtain the desired thiocyano ester. These reactions may be represented by the following equations wherein R represents a butyl-substituted cyclohexyl radical:

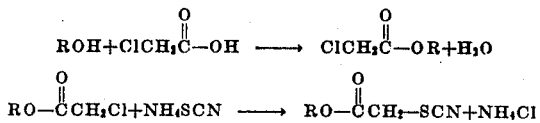

Suitable halogen-substituted acylating agents include the halogen-substituted aliphatic carboxylic acids, e. g. the chloro-, bromo- or iodo-substituted aliphatic carboxylic acids, including monochloroacetic acid, dichloroacetic acid, trichloroacetic acid, alpha-chloropropionic acid, beta-chloropropionic acid, the dichloropropionic acids, the dichlorobutyric acids, the chloroisovaleric acids, the chlorolauric acids, the chloromyristic acids, the chlorostearic acids, the chlorooleic acids, the chlororicinoleic acids, the chloromalonic acids and the corresponding bromo- or iodo-substituted acids. Mixtures may be utilized if desired, as may the anhydrides of the halogen-substituted carboxylic acids, or the acyl halides of these halogen-substituted carboxylic acids.

Suitable metal thiocyanates for use in the synthesis include those which are of a sufficiently reactive nature to undergo reaction with a halogen-substituted aliphatic acid. It is also desirable that the metal thiocyanates be relatively soluble in the reaction medium. In general, ammonium thiocyanate, the thiocyanates of the alkali metals, and the thiocyanates of the alkaline earth metals represent suitable reagents for use in effecting the conversion of the halogen-substituted esters to the thiocyano-substituted esters. Ammonium thiocyanate, sodium thiocyanate and potassium thiocyanate, are preferred members of this group.

It may be desirable, in some instances, when effecting the esterification of an alkyl-substituted cyclohexanol with an acylating agent, e. g. a halogen-substituted aliphatic carboxylic acid, to make use of an esterification catalyst to accelerate the reaction. Almost any of the esterification catalysts known to the art may be used for this purpose. Suitable catalysts include, for example, the mineral acids such as sulfuric acid or phosphoric acid. Para-toluene sulfonic acid represents a preferred catalyst, since it exerts the desired catalytic action without producing any substantial charring of the constituents of the reaction mixture. The catalysts are active in small amounts, an amount of catalyst which is equal to but about 1% by weight of the alcohol used being a sufficient amount in most cases.

Either step or stage of the above-described preferred method for preparing the presently disclosed thiocyano esters may be carried out in the presence of an inert solvent, such as methanol, ethanol, isopropanol, butanol, isobutanol, acetone, ethyl acetate, benzene, toluene, xylene, hexanes, octanes, isopropyl ether, hydrocarbon fractions, such as gasoline, etc. It is usually preferred to carry out the second step, i. e. the conversion of the chloro ester to the thiocyano ester, in an alcoholic medium. Each step may be carried out at any temperature within the range of between about 0° C. and about 250° C., and preferably in the range of between about 50° C. and about 150° C. It may be desirable to carry out the reactions of either step in the absence of oxygen, as, for example, in an atmosphere of carbon dioxide. The products of each stage are preferably vacuum distilled, although if only a crude product is desired, no distillation is needed.

As an example of the preferred method of forming the compounds of the present invention the following may be given:

4-tert-butylcyclohexanol was reacted with a slight molar excess of chloroacetyl chloride at a temperature of about 80 C. At the conclusion of the reaction, the reaction mixture was cooled, washed first with water and then with a dilute aqueous solution of sodium carbonate, and distilled. The product, i. e. the 4-tert-butylcyclohexyl chloroacetate was then reacted with an amount of ammonium thiocyanate which was slightly in excess of that amount theoretically required to react with the said chloroacetate, the reaction being carried out in alcoholic solution at reflux temperature for a period of about one hour. The ammonium chloride which was formed as a product of the reaction was then removed by filtration and the alcohol solvent separated by distillation. Distillation under reduced pressure of the residual product resulted in the separation of a good yield of 4-tert-butylcyclohexyl thiocyanoacetate, which boiled at 133° C.–136° C. at ca. 1 mm. and analyzed 12.3% S (12.55% calculated).

In a like manner the following compounds are prepared:

1-n-butylcyclohexyl thiocyanoacetate from 1-n-butylcyclohexanol and chloroacetic acid, 2-n-butylcyclohexyl thiocyanoacetate from 2-n-butylcyclohexanol and bromoacetic acid, 3-n-butylcyclohexyl thiocyanoacetate from 3-n-butylcyclohexanol and iodoacetic acid, 4-n-butylcyclohexyl thiocyanoacetate from 4-n-butylcyclohexanol and bromoacetic acid, 1-sec-butylcylohexyl thiocyanoacetate from 1-sec-butylcyclohexanol and chloroacetic acid, 2-sec-butylcyclohexyl thiocyanoacetate from 2-sec-butycyclohexanol and bromoacetic acid, 3-sec-butylcyclohexyl thiocyanoacetate from 3-sec-butylcyclohexanol and chloroacetic acid, 4-sec-butylcyclohexyl thiocyanoacetate from 4-sec-butylcyclohexanol and bromoacetic acid. 1-isobutylcyclohexyl alpha-thiocyanopropionate from 1-isobutylcyclohexanol and alpha-chloropropionic acid, 2-isobutylcyclohexyl beta-thiocyanopropionate from 2-isobutylcyclohexanol and beta-bromopropionic acid, 3-isobutylcyclohexyl thiocyanoacetate from 3-isobutylcyclohexanol and chloroacetic acid, 4-isobutycyclohexyl thiocyanostearate from 4-isobutylcyclohexanol and alpha-chlorostearic acid, 1-tert-butylcyclohexyl thiocyanoacetate from 1-tert-butylcyclohexanol and bromoacetic acid, 2-tert-butylcyclohexyl thiocyanoacetate from 2-tert-butylcyclohexanol and chloroacetic acid, 2-tert-butylcyclohexyl alpha-thiocyano propionate from 2-tert-butylcyclohexanol and alpha-chloropropionic acid, 2-tert-butylcyclohexyl beta-thiocyanopropionate from 2-tert-butylcyclohexanol and beta-bromopropionic acid, 2-tert-butylcylohexyl thiocyano-butyrate from 2-tert-butylcyclohexanol and chlorobutyric acid, 2-tert-butylcyclohexyl thiocyano-valerate from 2-tert-butylcyclohexanol and chlorovaleric acid, 2-tert-butylcyclohexyl thiocyanocaproate from 2-tert-butylcyclohexanol and bromocaproic acid, 2-tert-butylcyclohexyl thiocyano-palmitate from 2-tert-butylcyclohexanol and chloropalmitic acid, 2-tert-butylcyclohexyl thiocyanostearate from 2-tert-butylcyclohexanol and chlorostearic acid, 3-tert-butylcyclohexyl thiocyanoacetate from 3-tert-butylcyclohexanol and chloroacetic acid, 3-tert-butylcyclohexyl alpha-thiocyanopropionate from 3-tert-butylcyclohexanol and alpha-chloropropionic acid, 3-tert-butylcyclohexyl beta-thiocyanopropionate from 3-tert-butylcyclohexanol and beta-bromopropionic acid, 3-tert-butylcyclohexyl thiocyanobutyrate from 3-tert-butylcyclohexanol and chlorobutyric acid, 3-tert-butylvalerate from 3-tert-butylcyclohexanol and bromovaleric acid, 3-tert-butylcyclohexyl thiocyanocaproate from 3-tert-butylcyclohexanol and chlorocaproic acid, 3-tert-butylcyclohexyl thiocyanopalmitate from 3-tert-butylcyclohexanol and chloropalmitic acid, 3-tert-butylcyclohexyl thiocyanostearate from 3-tert-butylcyclohexanol and bromostearic acid, 3-tert-butylcyclohexyl thiocyanooleate from 3-tert-butylcyclohexanol and chlorooleic acid, 4-tert-butylcyclohexyl thiocyanoacetate from 4-tert-butylcyclohexanol and bromoacetic acid, 4-tert-butylcyclohexyl alpha-thiocyanopropionate from 4-tert-butylcyclohexanol and alpha-bromopropionic acid, 4-tert-butylcyclohexyl beta-thiocyanopropionate from 4-tert-butylcyclohexanol and beta-chloropropionic acid, 4-tert-butylcyclohexyl thiocyanobutyrate from 4-tert-butylcyclohexanol and chlorobutyric acid, 4-tert-butylcyclohexyl thiocyanovalerate from 4-tert-butylcyclohexanol and bromovaleric acid, 4-tert-butylcyclohexyl thiocyanocaproate from 4-tert-butylcyclohexanol and chlorocaproic acid, 4-tert-butylcyclohexyl thiocyano-palmitate from 4-tert-butylcyclohexanol and chloropalmitic acid, 4-tert-butylcyclohexyl thiocyanostearate from 4-tert-butylcyclohexanol and bromostearic acid, and 4-tert-butylcyclohexyl thiocyanooleate from 4-tert-butylcyclohexanol and chlorooleic acid.

I claim as my invention:

1. 4-tert-butylcyclohexyl thiocyanoacetate.

2. The 4-tert-butylcyclohexyl thiocyanopropionates.

3. An ester of a monoalkyl cyclohexanol and a thiocyano-substituted aliphatic carboxylic acid, which ester contains only one alkyl radical directly linked to a nuclear carbon atom of the cyclohexyl radical, and the single alkyl radical is a butyl radical which is directly linked to the nuclear carbon atom of the cyclohexyl radical in the 4 position relative to the acid radical.

4. An ester of a monoalkyl cyclohexanol and a thiocyano-substituted aliphatic carboxylic acid, which ester contains only one alkyl radical directly linked to a nuclear carbon atom of the cyclohexyl radical, and the single alkyl radical is the tertiary butyl radical which is directly linked to the nuclear carbon atom of the cyclohexyl radical in the 4 position relative to the acid radical.

5. An ester of a monoalkyl cyclohexanol and a thiocyano-substituted aliphatic carboxylic acid containing from 2 to 6 carbon atoms, which ester contains only one alkyl radical directly linked to a nuclear carbon atom of the cyclohexyl radical, and the single alkyl radical is the tertiary butyl radical which is directly linked to the nuclear carbon atom of the cyclohexyl radical in the 4 position relative to the acid radical.

PAUL H. WILLIAMS.